United States Patent
Oetzel

(10) Patent No.: US 7,440,972 B2
(45) Date of Patent: Oct. 21, 2008

(54) INTERACTIVE MEDIA AUTHORING WITHOUT ACCESS TO ORIGINAL SOURCE MATERIAL

(75) Inventor: Kenneth G. Oetzel, Novato, CA (US)

(73) Assignee: Sonic Solutions, Novato, CA (US)

( * ) Notice: Subject to any disclaimer, the term of this patent is extended or adjusted under 35 U.S.C. 154(b) by 795 days.

(21) Appl. No.: 10/123,816

(22) Filed: Apr. 15, 2002

(65) Prior Publication Data

US 2003/0193520 A1  Oct. 16, 2003

Related U.S. Application Data

(60) Provisional application No. 60/286,773, filed on Apr. 26, 2001.

(51) Int. Cl.
G06F 7/00 (2006.01)
G06F 17/00 (2006.01)

(52) U.S. Cl. .................. 707/104.1; 386/124; 386/45; 715/223

(58) Field of Classification Search ........... 707/3, 707/104.1; 715/223; 386/24, 124
See application file for complete search history.

(56) References Cited

U.S. PATENT DOCUMENTS

| | | | |
|---|---|---|---|
| 5,029,125 A | 7/1991 | Sciupac | |
| 6,016,553 A | 1/2000 | Schneider et al. | |
| 6,023,713 A | 2/2000 | Grimsrud et al. | |
| 6,573,907 B1 * | 6/2003 | Madrane | .............. 715/719 |
| 6,952,697 B1 | 10/2005 | Rothschild | |
| 2003/0007784 A1 * | 1/2003 | Loui et al. | .............. 386/111 |
| 2005/0154682 A1 | 7/2005 | Taylor | |

FOREIGN PATENT DOCUMENTS

| | | |
|---|---|---|
| EP | 0578391 A2 | 12/1994 |
| JP | 2000-40296 | 8/2000 |
| JP | 2000-339291 | 8/2000 |
| WO | WO96/15500 | 5/1996 |
| WO | WO 99/38098 | 7/1999 |
| WO | WO 00/51078 | 8/2000 |
| WO | WO 01/41452 | 6/2001 |
| WO | 03088248 | 10/2003 |

OTHER PUBLICATIONS

International Search Report mailed Feb. 7, 2003.

(Continued)

*Primary Examiner*—James K. Trujillo
*Assistant Examiner*—Jeffrey A Burke
(74) *Attorney, Agent, or Firm*—Fitch, Even, Tabin & Flannery

(57) ABSTRACT

The present invention relates to improvements in the generation of an authoring file, readable by an authoring program of a DVD-Video or other interaction video media, that defines the playback structure of the content residing in a given disc's "authored content zone" and also defines the location of the assets that make up the disc's "presentation data." The improvements allow generation of an authoring file that references assets that are within the authored content zone of the medium. This allows the authoring "project" from which the final DVD-Video disc image was created to be reopened in a compatible authoring program—and to be modified by such a program—without reference to any of the original source materials.

39 Claims, 6 Drawing Sheets

OTHER PUBLICATIONS

Hughes, K., "The Tools and Twists of DVD Authoring," *Emedia Professional*, vol. 10, NR. 12, pp. 37-40, 42, 44-46, 48, 50, XP002110307, ISSN: 1090-946X, p. 42.

European Patent Office, Supplementary European Search Report for EP 02 76 6809, Jun. 20, 2006.

Roman et al "Program Visualization: The Art of Mapping Programs to Pictures", ACM 1992, pp. 412-420.

Myers et al "A Multi-View Intelligent Editor for Digital Video Libraries", ACM 2001, pp. 106-115.

Texas Instruments "Video Compression, Evaluating System Tradeoffs with H.264, VC1, and other Advanced Codecs", http://cmpnetseminars.com/TSG/default.asp?q=248&K=HHOME, Jul. 21, 2005.

* cited by examiner

INTERACTIVE MEDIA AUTHORING WITHOUT ACCESS TO ORIGINAL SOURCE MATERIAL

The present application claims priority from provisional U.S. patent application Ser. No. 60/286,773, filed Apr. 26, 2001.

BACKGROUND OF THE INVENTION

1. Field of the Invention

This invention relates generally to the development of interactive visual media, and, more specifically, to improvements in systems used in the development ("authoring") of media content for delivery in the DVD-Video and other multimedia formats.

2. Background Information

The DVD-Video format is one of a number of formats, both standardized and proprietary, within the general category of interactive multimedia. These formats are capable of presenting motion or still images, along with accompanying sound, to an enduser (viewer) on a display such as a television screen or a computer monitor. The media are referred to as "interactive" because they allow the timing, order, and conditions governing presentation to vary depending on input from the end-user.

In a typical DVD-Video playback setting, user input is communicated to the playback device via either a remote control (as for a set-top DVD-Video player) or a computer mouse and keyboard (as for a DVD-ROM drive connected to a computer). The user responds to on-screen prompts or menus (lists of possible options) by pressing keys or clicking the mouse. The playback path through the material available to be played is altered according to the choices or "navigation" of the user.

When presenting DVD-Video program material, a DVD playback device works with two basic categories of data to create the experience of the end-user. Presentation data is the data that is actually seen or heard: the video, audio, graphics and text. Logical or control data is information about the order and conditions under which presentation data is presented. Logical data defines the way the content is organized, and also the way in which user input will affect the navigational flow through the presentation data. The details of the various aspects of the DVD storage means and protocol are described more fully in "DVD specification for Read-Only Disc, Physical, File Format and Video Specifications", DVD Consortium, 1997, which is hereby incorporated by reference in its entirety.

The process of creating interactive multimedia is generally referred to as "authoring." Authoring is usually accomplished using one or more software applications running on a computer. In DVD-Video authoring, a disc or collection of discs that are created to be a single unit is commonly referred to as a "DVD title." The authoring work in progress on a given title is commonly referred to as a "project."

The heart of authoring is the defining of the logical data used to structure the playback of presentation data, such as defining the "user interface" (e.g. menus) used to navigate the program, the choices offered to users during playback, and the response of the playback device to user input. During this process, the project's presentation data is normally stored on a hard-drive where it is accessible—locally or via a network—to the authoring system. This allows the author to review the effects of authoring decisions on the way in which the program material is presented.

During the process of defining a project's logical data, the presentation data to which the logical data refers may be in any file format supported by the authoring software, and may be stored at any accessible location. In a project using multiple video clips, for instance, the source file for one clip might be an .AVI file stored on the authoring system's internal hard-drive, for another it might be an MPEG-2 file on an external hard-drive, and for a third it might be a QuickTime file accessed from a server over a network.

Each authoring program has its own method of keeping track of the location and format of the presentation files used in a given project, and also keeping track of the logical data decisions that are made during authoring. One such approach is AuthorScript, developed by Sonic Solutions and used in several of its authoring programs. Other approaches are described, for example, in International Patent Application WO 99/38098, published 29 Jul. 1999, and U.S. Pat. No. 6,023,713, both of which are hereby incorporated by reference. In the AuthorScript approach, an AuthorScript (.AS) authoring file is created by the authoring program to store both "structure" information related to a project's logical data, and "asset" information about a project's presentation data. Further aspects relating to the production of interactive optical media are described International Patent Application WO 96/15500, May 23, 1996, and related U.S. patent application Ser. No. 676,121, both of which are also hereby incorporated by reference.

This process is shown schematically in FIGS. 1 and 2. FIG. 1 is a flow chart with file being opened in steps 101-105, the editing process in steps 107-109, the formatting processing in steps 111-119, and the disc image is written in step 121.

When an existing project is "opened" (or a new authoring file started) in step 101, the project file, for example the AS file in an AuthorScript-based authoring program, is read and the asset information in it is used to locate the source files of the presentation data in step 103. The structure data, meanwhile, is used in step 105 to restore the project's logical state. Step 105 need not be subsequent to step 103, but can occur before or overlap step 103.

As the project is edited (steps 107-109), new assets can be added in step 108 and changes are stored in the project file in step 109, making an up-to-date record of the author's progress on the project.

At the end of the authoring process, when all the decisions regarding logical data are finalized, the project is formatted for delivery on a DVD in steps 111-119. In step 111, the formatting software reads the project file, evaluates the information therein, and carries out a series of operations that convert the project's current state into a form that is playable from a DVD-Video playback device.

In terms of presentation data, in step 113 the process first involves locating the various source files referenced in the project file and, where necessary, converting those files in step 115 to "elemental streams," which are files in the formats used by DVD-Video for the various types of presentation media (e.g. video source files that are not already in the MPEG-2 video format are converted to that format). This may involve "transcoding" of one or more video files (e.g. a complete feature film) from one format to another. In some cases, it may also involve "compositing" several distinct components found in separate files into a unified whole in step 117. Compositing is particularly common in the case of menus, which often involve a number of visual elements that reside in different files during the authoring process.

With the elemental streams existing in the appropriate file formats for use in DVD, they can then be multiplexed together at step 119 into the Video Object files that are used by a DVD playback device. The logical data created in authoring is also organized into a set of files that can be read and interpreted by a playback device designed to play back discs in the DVD-Video format. Then a "disc image" is written in step 121 that embodies the entire directory structure and data files that will appear on the final disc, with the logical and presentation files all residing in a VIDEO_TS directory (the "DVD-Video zone", or, more generally, the "authored content zone"), from which they can be read by a DVD-Video playback device.

FIG. 2 is a block diagram representing the various elements of this process. The workstation 201 used for the authoring process contains the authoring file 210 with the project's structure information 211 and asset information 213. The source files can either be stored on the workstation internal hard drive 225 or at external source 223. When the editing process is finished, the Video Object files are formed at formatting 230 and the disc image, containing the logical and presentation data, is supplied to the disc writer 240 and placed onto the disc 250.

A disc image is the source for all the DVDs that are made of a given title, whether replicated in a DVD plant or recorded onto a recordable DVD medium. However, the disc image cannot itself be opened as a project in a DVD-Video authoring program. A DVD-Video disc, therefore, is not functionally equivalent to the project from which it was made, and any subsequent changes to the project can currently only be accomplished by going back to the project file and the source assets it references.

SUMMARY OF THE INVENTION

The present invention relates to improvements in the generation of authoring files, allowing a version of a project file to be stored on the destination medium that can be accessed and altered without additional source files. In an exemplary embodiment, an authoring file readable by a DVD-Video authoring program defines the playback structure of the DVD-Video material residing in a given disc's "DVD-Video zone" and also defines the location of the assets that make up the disc's DVD-Video "presentation data." The improvements allow generation of an authoring file that references assets on the disc that are within the DVD-Video zone of the same DVD on which that authoring file resides as well as referencing assets stored outside of the DVD-Video zone. By being able to access assets within the DVD-Video zone, a redundant copy need not be stored outside of the DVD-Video zone, thereby reducing the space required to store the project on the medium.

This allows the authoring project from which the final DVD-Video disc image was created to be reopened in a DVD-Video authoring program that can read authoring files—and to be modified by such a program—without reference to any source materials other than those stored on the same DVD. The project can be opened and worked on at a workstation without the project's original source files. The current state of the project can also be viewed on a standard player for the medium in an intermediate stage of the project.

DESCRIPTION OF REPRESENTATIVE EMBODIMENTS

Figure 1:
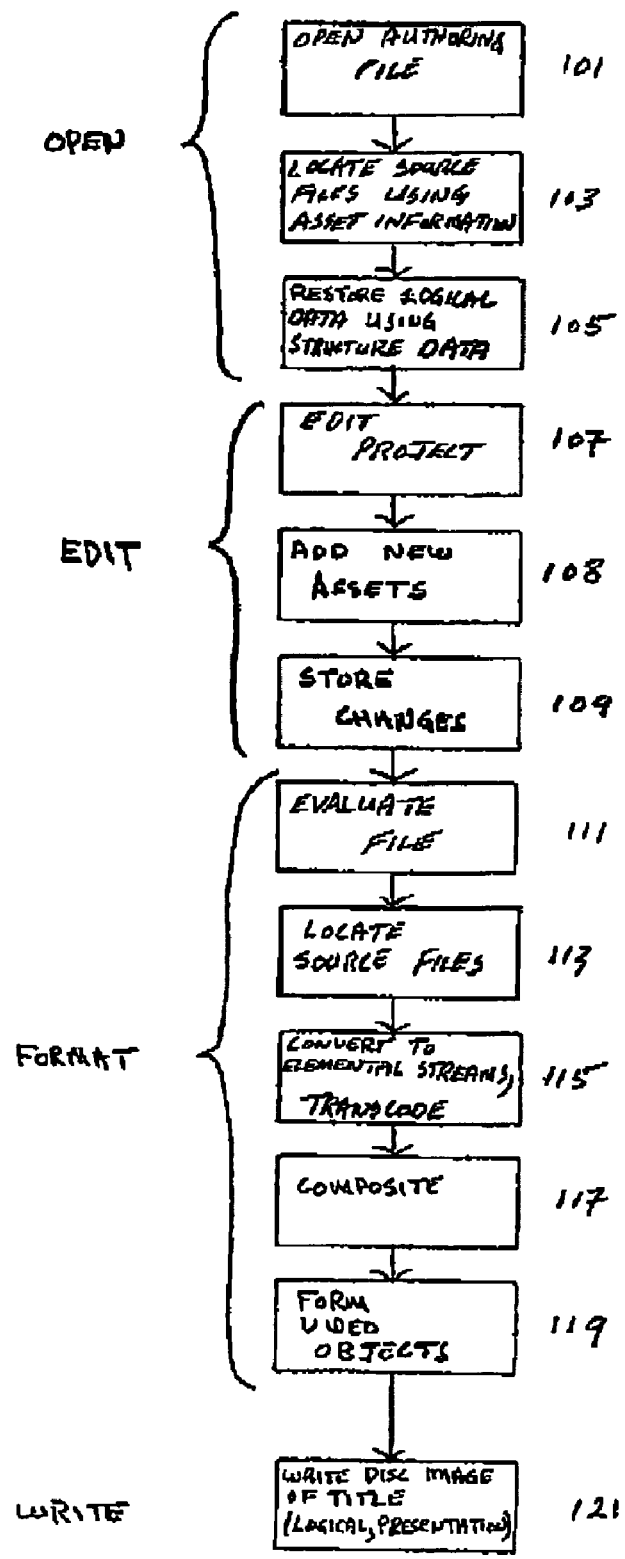
FIG. 1 is a flowchart of a prior art authoring method.

The general context of the invention is the authoring process in interactive media, including but not limited to such optical disc formats as DVD-Video, DVD-Audio, Video CD, and Super Video CD, as well as media hosted by a server and delivered over a network. In order to provide a specific example, the following description describes an exemplary implementation of the invention in the context of a software application used for authoring DVD-Video discs. The present invention allows a project to be updated in a seamless fashion based only assets on the medium. Although this updating is generally discussed below as being performed on a workstation or personal computer, the present invention also applies to consumer electronic devices and not just PCs or workstations. Additionally, as this discussion is mainly in terms of DVD-Video, the presentation data is mainly described as being viewed, although more generally it may additionally (or solely, in the DVD-Audio case) included presenting audio content.

There are several reasons why it would be valuable to be able to open a DVD project directly from the DVD title created from that project. For archival applications, for instance, a single "editable disc" with this capability could serve as a convenient record not only of the title, but also of the project and its component parts. Publishers of DVD "clip media," meanwhile, could offer products containing media that is at once easily viewable in a standard DVD-Video (or other appropriate for the medium's protocol) player and also easily incorporated into different projects authored with compliant authoring systems. Further, when editing a compliant disc, only the specific portions of a title that are being changed need to be transferred to the workstation's hard disk, generally allowing the disc to be edited more quickly.

An editable DVD disc could also improve workflow within and between facilities involved in DVD title preparation. Video editors preparing a project's video content could use a simple DVD "plug-in" in their editing program to output their work to a DVD-Video compliant writable disc, such as DVD-R, allowing the work to be evaluated and approved using a readily available DVD player hooked to a TV. Without any additional transfers, the project could then be handed-off to DVD authoring specialists working with a common authoring programs, who would use the materials on the DVD-R as the starting point for authoring the final version of the DVD title.

One way to create an editable DVD of a given project would be to place the project's authoring file (or, more generally, "authoring index data"), for example the AS file in the AuthorScript approach, along with all the source files referenced by that AS file, on the DVD in what is often referred to as the "DVD Others zone", or more generally the "other data zone", meaning outside of the VIDEO_TS directory. However, this would mean that all the presentation data on the disc, which accounts for the vast majority of data involved in any DVD project, would be stored on disc twice, once in the presentation data of the authored content zone and again (possibly in a different form) in the "DVD Others zone." In the case of most titles, there is not enough data-storage capacity on the DVD to store redundant versions of all the presentation data files. Even in cases where the space is available, this double storage can eventually limit how much new material can be added as the authoring process progresses.

The present invention presents a method to create an editable interactive media title, meaning, for example, a DVD-Video disc that includes all the materials needed to recreate and edit the DVD project from which the title was made, without reference to any external files. The method does not require that all the source files used in the project be stored redundantly on the disc.

The method involves new operations added to the formatting process of authoring software. These operations are performed in addition to the formatting steps, outlined in Background of the Invention above, normally undertaken to convert a project into a disc image. These operations may be accomplished using established computer programming techniques.

It is well known in the art that logic or digital systems and/or methods can include a wide variety of different components and different functions in a modular fashion. The following will be apparent to those of skill in the art from the teachings provided herein. Different embodiments of the present invention can include different combinations of elements and/or functions. Different embodiments of the present invention can include actions or steps performed in a different order than described in any specific example herein. Different embodiments of the present invention can include groupings of parts or components into larger parts or components different than described in any specific example herein. For purposes of clarity, the invention is described in terms of systems that include many different innovative components and innovative combinations of innovative components and known components. No inference should be taken to limit the invention to combinations containing all of the innovative components listed in any illustrative embodiment in this specification. The functional aspects of the invention, as will be understood from the teachings herein, may be implemented or accomplished using any appropriate implementation environment or programming language, such as C++, Java, JavaScript, etc.

Figure 3:
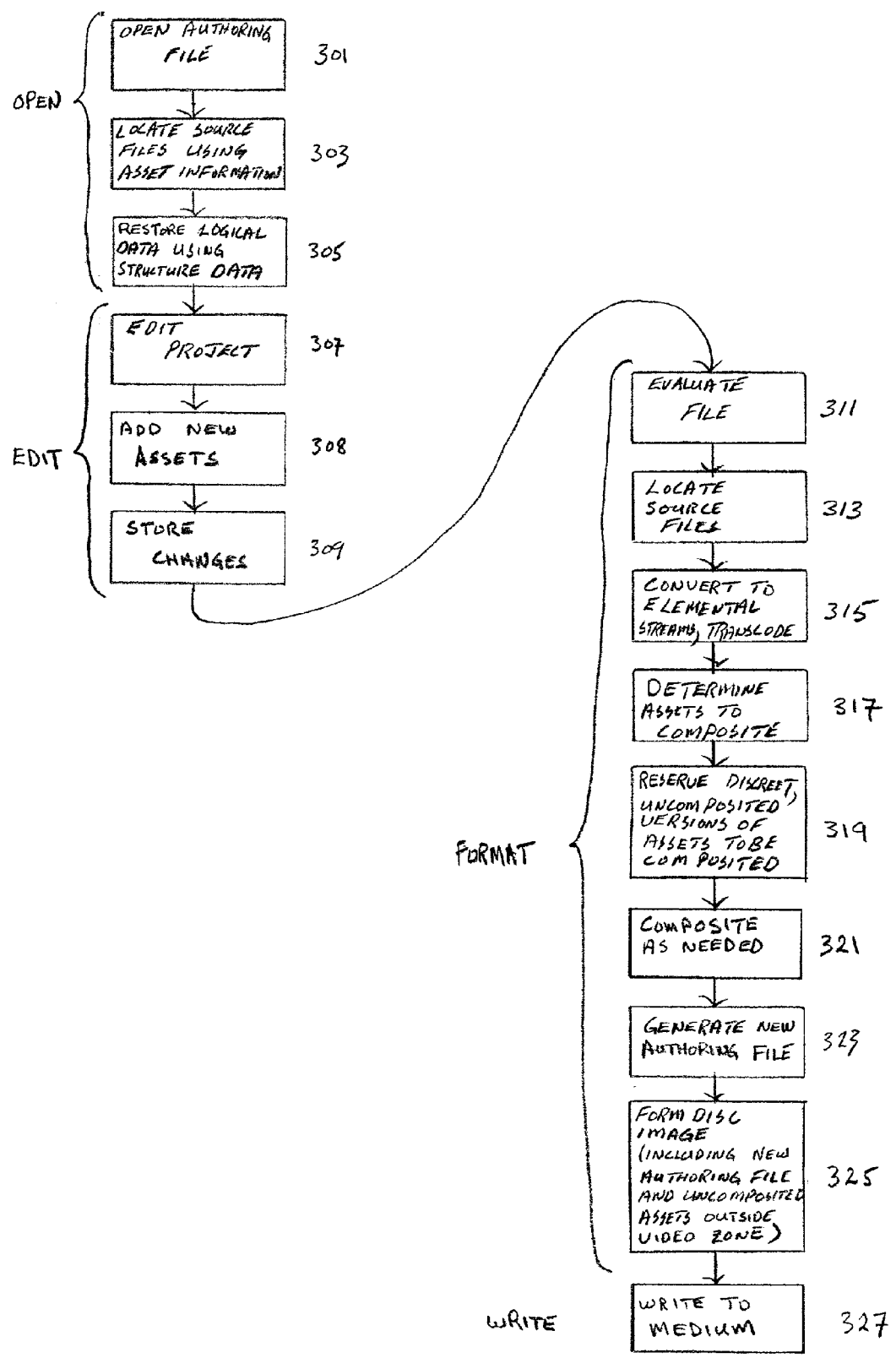
FIG. 3 is a flowchart of the authoring process according to one embodiment of the present invention.

More specifically, with reference to FIG. 3, a flowchart presents an exemplary embodiment of the present invention. The process begins as in the prior art process shown in FIG. 1, where the project has not yet been placed on the disc according to the invention, with steps 301, 303, and 305 respectively corresponding to steps 101, 103, and 105 as described in the Background section where an existing project is opened or a new authoring file started. As will be described below, once the project has been place on the medium, a version of the authoring file with its structure and asset files can be opened from the medium itself. Similarly, the editing process of steps 307, 308, and 309 will be the same as in steps 107, 108, and 109 in the process of FIG. 1 at this point.

The present invention changes the formatting process relative to the prior art: whereas in the process of FIG. 1 formatting occurs once the editing process is finalized and the project can not be changed once it is formatted and committed to the medium; according to the present invention, the project can be committed to disc whether the authoring process is finished or in an intermediate stage that will be edited further. In step 311, the formatting software reads the authoring file, evaluates the information therein, and carries out a series of operations that convert the project's current state into a form that is playable on a playback device for the assets that are going to be part of the current presentation data. In step 313, the source files referenced in the authoring file are located. Unlike in FIG. 1, the formatting software now evaluates each asset in the asset reference section of the authoring file and determines which of the assets will undergo compositing during formatting in the subsequent steps.

For the assets going into the presentation data of the project, the files are converted to "elemental streams", if needed, in step 315. As before, this puts these files in the formats used by DVD-Video for the various types of presentation media and may involve "transcoding" of one or more video files from one format to another. Assets that are not part of the presentation data in the project's current form and will be going in non-composited form into the "other data zone" can be left as they are or put into an intermediate form. In step 317 the formatting software now evaluates each asset in the asset reference section of the authoring file and determines in step 317 which of the assets will undergo compositing during formatting in the subsequent steps.

Step 319 reserves the discrete, uncomposited version of the assets that will be composited for inclusion in the authored content zone, the "DVD Video Zone" in the example. The composting occurs in step 321. The stream assets used to create composited streams can optionally be included in uncomposited form outside the VIDEO_TS directory, in their discrete, uncomposited state, but need not be in order to save space.

An important aspect of the present invention is how the formatting process of FIG. 3 differs from that of FIG. 1. In step 117, the process of FIG. 1 involves compositing several distinct components found in separate files into a unified whole that then goes into the Video Objects of step 119. In this prior art process, the compositing cannot be undone. In contrast, the formatting process of the present invention determines which elements to save before they are composited so that the compositing step can be repeated in future edits.

A new authoring file, or authoring index data, is generated in step 323. The locations of referenced assets used during authoring are replaced by new locations within the disc image. For assets that are not composited, the new locations referenced will be within the VIDEO_TS directory of the disc image. For assets that are composited, the new locations referenced will be outside the VIDEO_TS directory of the disc image. In step 325, the disc image is formed. The newly generated authoring file will be included in the disc image, outside the VIDEO_TS directory. The uncomposited assets will also be placed outside of the video zone. Finally, the project—as opposed to the completed title in FIG. 1—is written into the medium in step 327.

Figure 2:
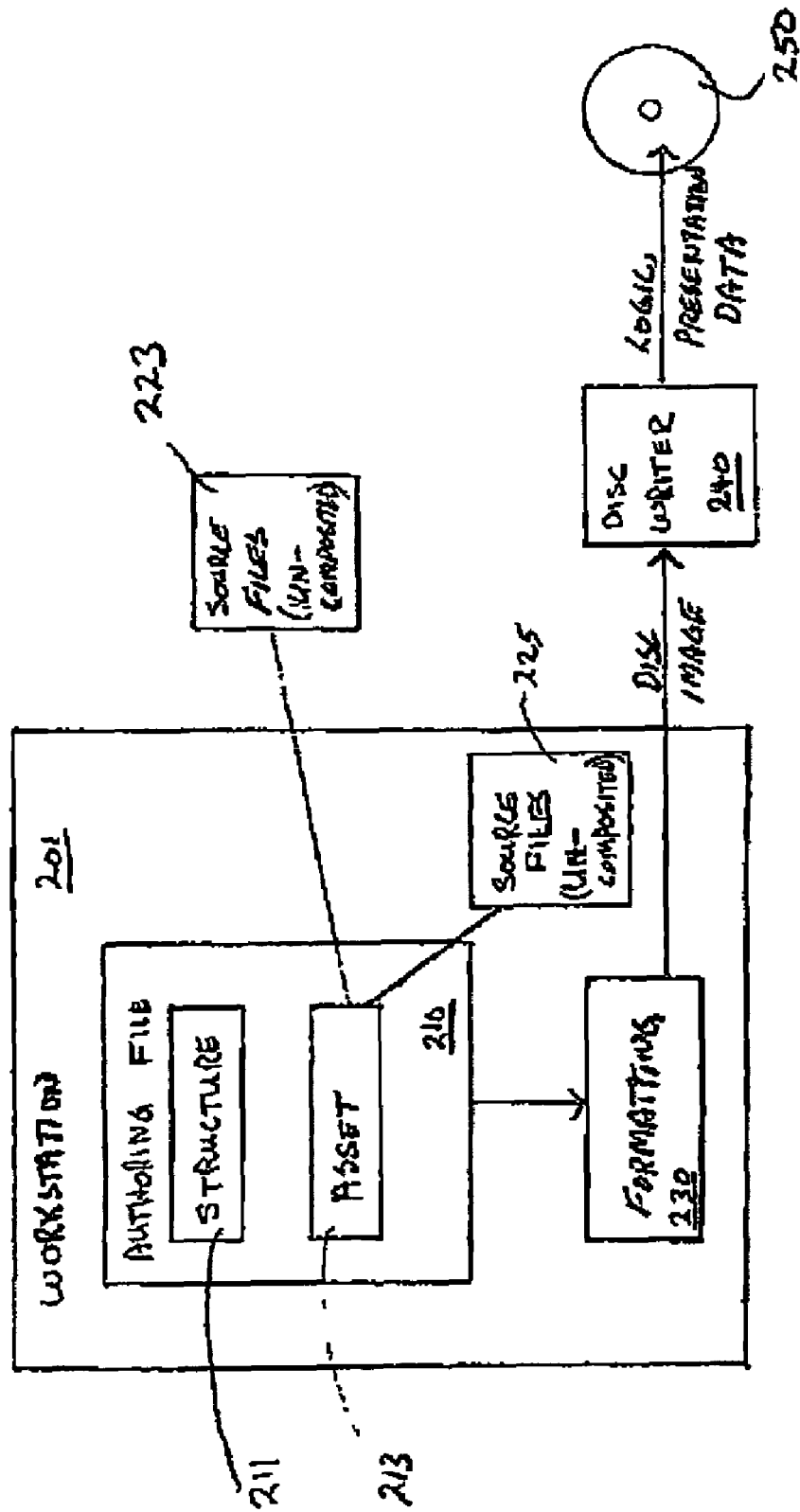
FIG. 2 is a box diagram of the elements used in the process of FIG. 1.
Figure 4:
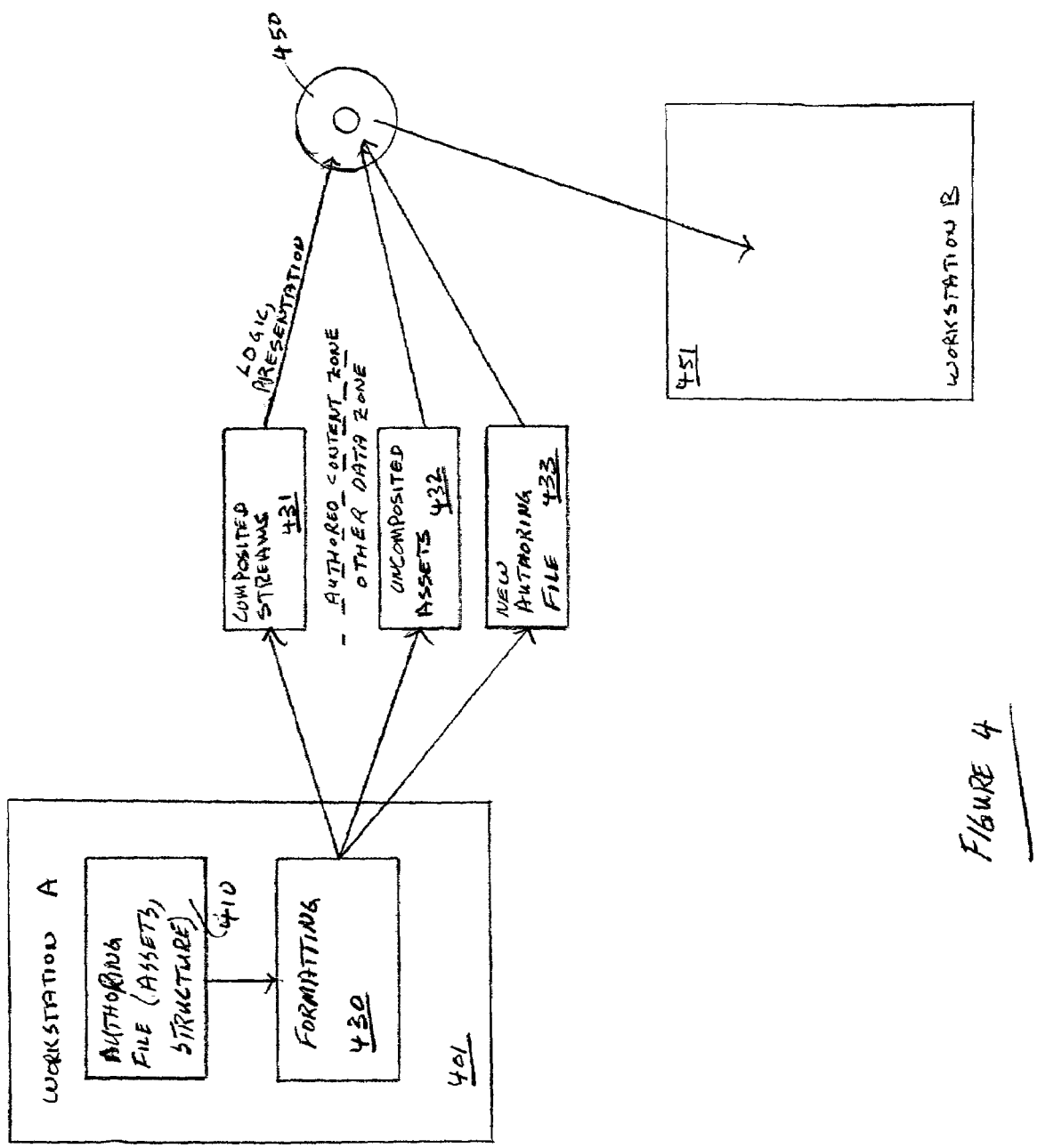
FIG. 4 is a schematic diagram of an embodiment of the present invention whereby the DVD is editable without access to external source material.

This process is represented schematically in the FIG. 4, where the newly generated authoring file is now included on the disc along with both the composited and uncomposited assets. The initial workstation 401 again has the initial authoring file 410 with its structure and asset information, where some of the corresponding elements shown FIG. 2 are simplified here, that is then supplied to formatting 430. As in the prior art, the processed assets and logical and presentation data are placed on the disc 450 so the current state of the title associated with the project can be viewed on a standard player designed for the medium's protocol. In contrast to the case described in the Background section, the disc image will also contain uncomposited assets 432 and the new authoring file 433. In the DVD example, disc image elements 432 and 433 will be placed in the DVD other zone. At this stage, the project can be opened and worked upon in another workstation 451 with a compatible authoring program (or again in workstation A 401) using only the information stored on the medium 450.

In addition to the steps above, the method also calls for modifications (accomplished using established computer programming techniques) to the capabilities of authoring software, allowing the software's asset management module to recognize assets in the VIDEO_TS directory of a DVD.

A DVD created using the method will be editable by any DVD authoring software incorporating the process of FIG. 3. With the disc in a DVD drive in an authoring workstation, the authoring program will read the asset reference section of the authoring file on the disc, thereby gaining access to all the source assets used to create the disc, including the uncomposited elements that make up menus and other composited parts of the title. Only these uncomposited elements—usually a small portion of the overall presentation data—need be stored redundantly to the presentation data already stored within the VIDEO_TS directory. The authoring program will also have access to the title's logical data, stored in a form compatible with the authoring program in the structure section of the authoring file. For example, when AuthorScript is used, stored in an AuthorScript-compatible form in the structure section of the AS file. At that point the re-created project will be editable just as it was at the time the title was formatted and the disc image created. The authoring process starting from the disc, for example disc 450 at workstation 451 of FIG. 4, is described in FIG. 5.

At the end of step 325 of FIG. 3, the current state of the project is in a self-contained form no longer requiring access to the original source material. Based on the composited streams 431, uncomposited assets 432, and the new authoring index data, the project can be reopened in another workstation with a compatible authoring program, but without the original assets. Although step 327 of FIG. 3 shows this material written to the medium (450 in FIG. 4) and reopened from the medium in step 501 of FIG. 5, this self-contained form of the project could instead be transferred to another work station directly without being committed to disc. In another variation, the composited streams 431 and uncomposited assets could be written to the medium, but the authoring file could be provided form another source based on an association with the medium and be retrieved by the workstation from this source, such as the internet or other network.

The process of FIG. 5 again begins with opening the authoring file, but in this case from the DVD or other medium to which it was written. In addition to the standard presentation and logic data that would former have been on the disc, the various uncomposited assets are on the medium in the other data zone with the new authoring file. As the disc holds the new authoring file containing uncomposited assets and structural data, the project is no longer tied to the original workstation but is in a portable form that can be opened on a new workstation. For example, in the prior art only the final form of, say, a menu would be on the disc; instead, according to the present invention, the discreet assets composited together during authoring process to make the menu (such as menu background, button images, and text) are now stored separately in atomic form in the other data zone of the medium.

Figure 5:
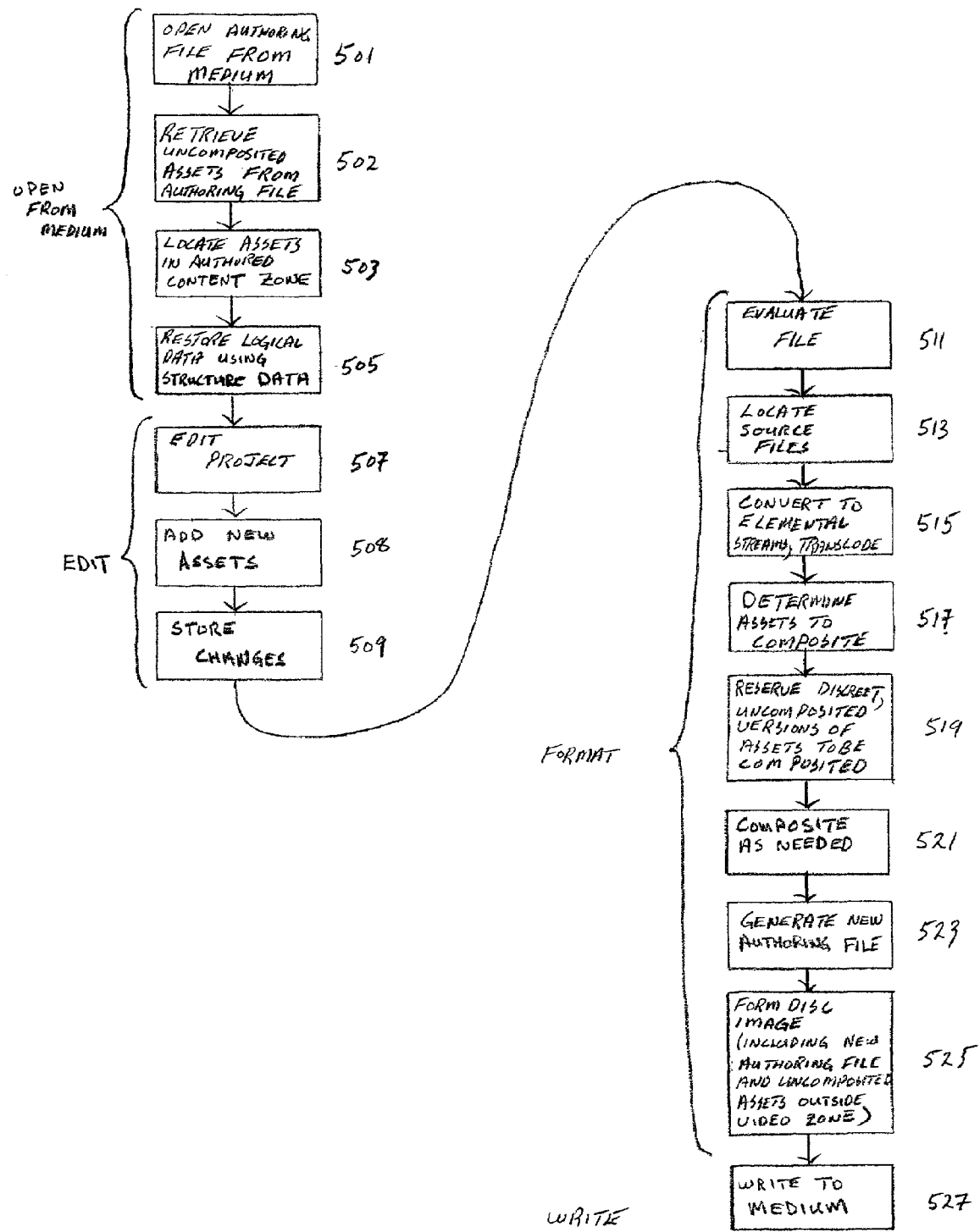
FIG. 5 is a flowchart of the authoring process starting from a disc as formed in the process of FIG. 4.

The process of FIG. 5 differs most from that of FIG. 3 in the opening process of steps 501-505. In step 501, the authoring index data or file is opened on a PC or workstation from the disc or other medium. In step 502 the uncomposited assets are retrieved from the authoring file in the other data zone. Step 503 locates assets within the authored content zone. The various assets can either be copied to local storage on the workstation (such as memory or hard disc) or left on the medium. This may depend upon whether the media is of the write-once type or rewritable as well as the on the approach used by the authoring application. For example, only the specific portions of the title that are being modified need be transferred to hard disk, allowing most DVDs to be edited more quickly. For a write-once DVD, since the further edited project can not be written back to the same disc that provided the authoring file in step 501, all of the assets to be retained in the project will need to be downloaded onto the workstation to be rewritten at step 527 below. Further aspects of the process are discussed in a provisional patent U.S. application entitled "Method and Apparatus for Optimizing the Recording on a Rewritable DVD or CD Disc of Revisions to an Existing DVD-Video Volume on that Disc", by Kenneth G. Oetzel and Henry Van Horik, filed on Apr. 4, 2002, which is assigned to Sonic Solutions and is hereby incorporated by reference.

The editing process of steps 507-509 will be performed as in steps 307-309 of FIG. 3, except the assets may reside on the medium. The new assets of step 508 can be added to the project as in steps 308 and 108. Similarly, the formatting of steps 511-525 will be the same as in steps 311-325, except that for some assets, some of the steps will have been previously performed before the assets were initially placed on the medium in the process of FIG. 3. Finally, in step 527, the project (or finished titled) is again written back onto the medium as in step 327. This may be the same medium as opened in step 501 (for example, in the case of a rewritable DVD), a different copy of the same type of medium (for example, in the case of a write-once DVD), or a different type of medium.

Figure 6:
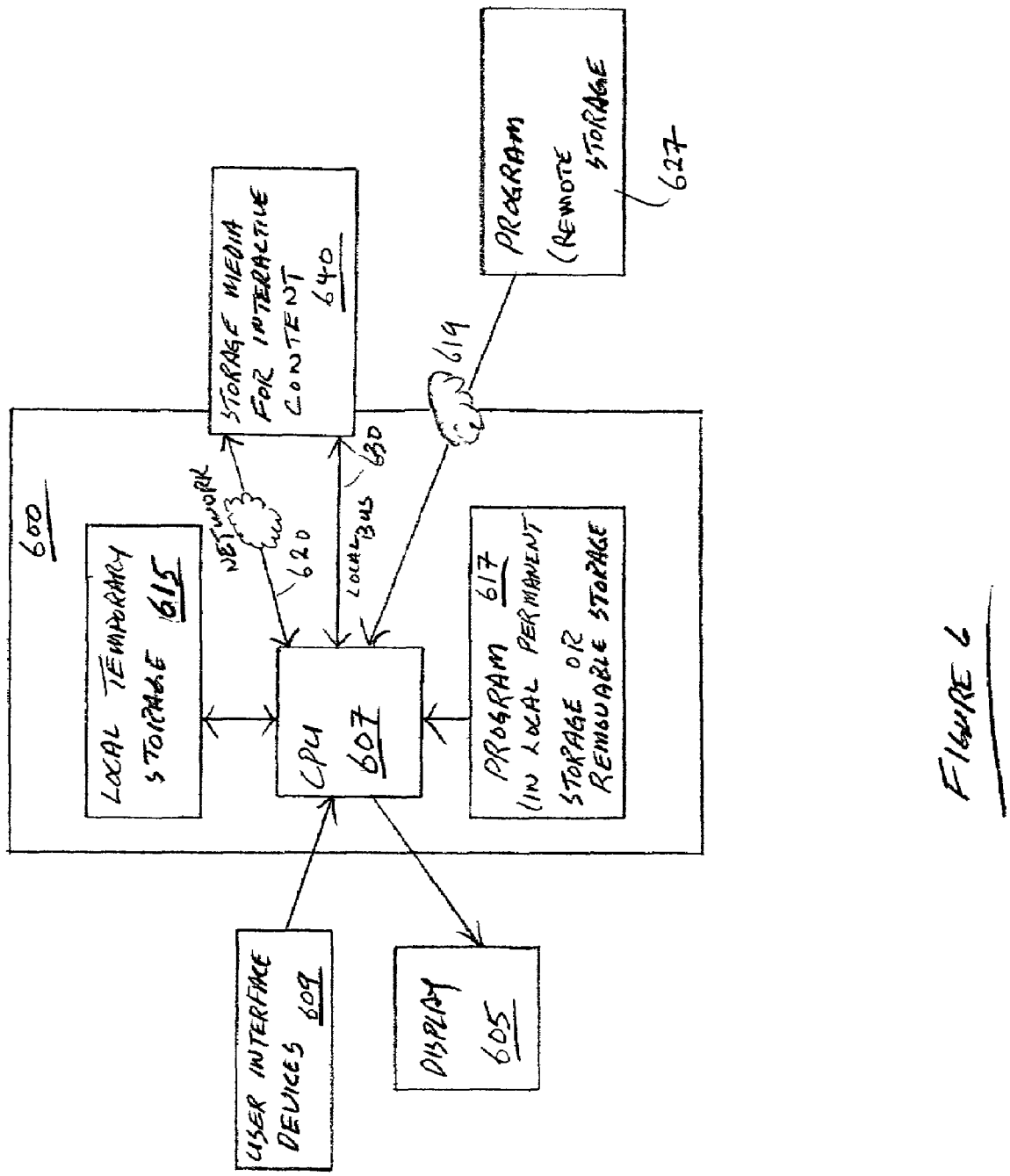
FIG. 6 is a box diagram showing the invention implemented in hardware and/or software.

As shown in FIG. 6, the invention can be implemented in hardware and/or software. In some embodiments of the invention, different aspects of the invention can be implemented in either client-side logic or a server-side logic. As will be understood in the art, the invention or components thereof may be embodied in a fixed media program component containing logic instructions and/or data that when loaded into an appropriately configured computing device cause that device to perform according to the invention. As will be understood in the art, a fixed media program may be delivered to a user on a fixed media for loading in a users computer or a fixed media program can reside on a remote server that a user accesses through a communication medium in order to download a program component.

FIG. 6 shows an information appliance (or digital device) that may be understood as a logical apparatus that can read instructions from local storage 617 and/or remote storage 627 through a network connection 619. Apparatus 600 can thereafter use those instructions to direct server or client logic, as understood in the art, to embody aspects of the invention. One type of logical apparatus that may embody the invention is a computer system or consumer electronics devices 600 as illustrated in the block form in FIG. 6, containing elements such as CPU 607, input devices (such as a keyboard or mouse) 609, memory or disk drives 615, and display or speakers 605. Data storage media 615 and 617 may be used to program such a system and may represent a disc-type optical or magnetic media, magnetic tape, solid state memory, etc. The invention may be embodied in whole or in part as software recorded on this storage media. Communication port 619 may also be used to initially receive instructions that are used to program such a system and may represent any type of communication connection. Disc images, uncomposited assets, authoring project files, and other data are read from or written to storage media 640 by means of local bus 430 or remote data port 440 or other data input/output mechanisms.

The invention also may be embodied in whole or in part within the circuitry of an application specific integrated circuit (ASIC) or a programmable logic device (PLD). In such a case, the invention may be embodied in a computer understandable descriptor language which may be used to create an ASIC or PLD that operates as herein described Although the various aspects of the present invention have been described with respect to specific exemplary embodiments, it will be understood that the invention is entitled to protection within the full scope of the appended claims.

It is claimed:

1. A method of forming interactive media content compatible with a media protocol, comprising:
    providing asset content;
    formatting a first portion of the asset content to be viewable on a player compatible with the media protocol;
    identifying a second portion of the asset content;
    forming authoring index data referencing the formatted first portion of the asset contents and the second portion of the asset contents;
    forming a media image including the formatted first portion of the asset contents and the second portion of the asset contents in discreet form, wherein the media image is editable after the media image is formed when the media image is opened on a workstation accessing the authoring index data; and
    writing the media image to a computer readable storage medium;
    wherein the identifying the second portion of the asset content comprises evaluating the assets of the first portion of the asset content, and identifying one or more assets that are to be composited and defining the assets identified to be composited as at least part of the second portion of the asset content to be incorporated into the media image in an uncomposited form.

2. The method of claim 1, wherein the media image further includes the authoring index data such that the authoring index data is within and part of the media image.

3. The method of claim 2, wherein authoring index data comprises references identifying locations within the media image to the first and second portions of the asset contents.

4. The method of claim 1, wherein the media is an optical disc format.

5. The method of claim 4, wherein the protocol is the DVD-Video protocol.

6. The method of claim 4, wherein the protocol is the Video CD protocol.

7. The method of claim 4, wherein the protocol is the Super Video CD protocol.

8. The method of claim 4, wherein the protocol is the DVD-Audio protocol.

9. The method of claim 1, wherein the formatted first portion of the assets forms part of an authored content zone content and wherein the second portion of the assets form part of an other data zone content.

10. The method of claim 9, wherein the authored content zone comprises a Video_TS zone and wherein the other data zone is exterior to the Video_TS zone.

11. The method of claim 1, wherein said formatting comprises compositing said first portion of the assets.

12. The method of claim 11, wherein said second portion of the assets includes assets in uncomposited form.

13. The method of claim 12, wherein said uncomposited form comprises the discrete, uncomposited version of the assets that are included in the authored content zone.

14. The method of claim 11, wherein said second portion of the assets includes in uncomposited form assets composited in said compositing said first portion of the assets where the uncomposited from of the assets in the second portion of the assets comprises presentation data in uncomposited form of presentation data composited in the first portion of the asset content.

15. The method of claim 11, wherein said compositing comprises combining several distinct elements found in separate files into a unified whole.

16. An electronic data file, on a storage medium, that is adapted to cause an appropriately configured digital apparatus accessing the electronic data file to operate in accordance with the method of claim 1.

17. The method of claim 1, wherein the computer readable medium comprises a computer readable portable storage medium such that the media image is recorded to the computer readable portable storage medium, where said image is editable upon access through the portable storage medium.

18. The method of claim 1, wherein the forming the media image comprises forming the media image such that the media image is editable after its formation based on information in the media image without reference to external files and external assets.

19. The method of claim 1, wherein the forming the media image comprises forming the media image that is editable after it is formed such that at least the first portion of the asset content can be edited.

20. The method of claim 1, wherein the forming the media image comprises forming the media image that is editable after it is formed such that at least logical data of the media image is editable after the media image is formed.

21. The method of claim 1, wherein the forming the media image comprises forming the media image that is editable after it is formed so that navigation flow through at least a portion of the first portion of the asset content of the media image is editable after the media image is formed.

22. The method of claim 1, wherein the forming the media image comprises forming the media image that is editable after it is formed so that presentation data of the media image is editable after the media image is formed.

23. An electronic data file, on a storage medium, that is adapted to cause an appropriately configured digital apparatus accessing the electronic data file to operate in accordance with a process for forming interactive media content compatible with a media protocol, the process comprising:
    receiving asset content;
    formatting a first portion of the asset content to be viewable on a player compatible with the media protocol where the formatted first portion of the asset content comprises presentation data to be played back through the player and logical data where the logical data defines organization and structured authoring of the presentation data within the formatted first asset content in compliance with the media protocol;
    identifying a second portion of the asset content;
    forming authoring index data referencing the formatted first portion of the asset contents and the second portion of the asset contents; and
    forming a media image including the formatted first portion of the asset contents and the second portion of the asset contents in discreet form, wherein the media image is editable after the media image is formed when the media image is opened on a workstation accessing the authoring index data.

24. The electronic data file of claim 23, the process further comprising:
    writing the media image to a medium compatible with the media protocol.

25. The electronic data file of claim 23, the process further comprising:

receiving input whereby the first portion of the asset content can be determined.

26. The electronic data file of claim 23, wherein the media image further includes the authoring index data such that the authoring index data is within and part of the media image.

27. The electronic data file of claim 23, wherein the media is an optical disc format.

28. The electronic data file of claim 27, wherein the protocol is the DVD-Video protocol.

29. The electronic data file of claim 27, wherein the protocol is the Video CD protocol.

30. The electronic data file of claim 27, wherein the protocol is the Super Video CD protocol.

31. The electronic data file of claim 27, wherein the protocol is the DVD-Audio protocol.

32. The electronic data file of claim 23, wherein the formatted first portion of the assets forms part of an authored content zone content and wherein the second portion of the assets form part of an other data zone content.

33. The electronic data file of claim 23, wherein said formatting comprises compositing said first portion of the assets.

34. The electronic data file of claim 33, wherein said second portion of the assets includes assets in uncomposited form.

35. The electronic data file of claim 33, wherein said second portion of the assets includes in uncomposited form assets composited in said compositing said first portion of the assets such that the assets in uncomposited form comprise presentation data in uncomposited form of the presentation data composited in said compositing said first portion of the assets.

36. The electronic data file of claim 23, wherein the identifying the second portion of the asset content comprises:
evaluating the assets of the first portion of the asset content; and
identifying one or more assets that are to be composited and defining the assets identified to be composited as at least part of the second portion of the asset content to be incorporated into the media image in an uncomposited form.

37. The electronic data file of claim 23, further comprising:
accessing a user interface and through the user interface:
identifying a plurality of presentation data comprising content to be played back;
defining logical data coordinating organization and conditions associated with the presentation data dictating the organization and conditions under which the presentation data are to be presented during playback, and further dictating a navigational flow through the presentation data to be employed while accessing the presentation data through the media image during playback; and
implementing the compiling and the formatting to generate through to the user interface a file of the formatted first portion of the asset contents comprising the presentation data, the logical data and navigation flow.

38. The electronic data file of claim 23, further comprising:
locating source files referenced in the authoring index data;
evaluating each asset in an asset reference section of an authoring file;
determining which of the assets are to undergo compositing;
identifying assets that are to be part of presentation data;
identifying assets that are to undergo compositing;
reserving discrete, uncomposited versions of identified assets that are to be composited;
composting the identified assets forming a composited content;
implementing the forming of the authoring index data comprising replacing locations of referenced assets of the assets identified to be composited used during authoring with new locations within the composited content; and
implementing the forming of the disc image such that the disc image comprises the authoring index data, the composited assets and the uncomposited versions of identified assets where the uncomposited versions of identified assets are distinct from the composited assets.

39. The electronic data file of claim 23, wherein the logical data further defines conditions under which the presentation data is presented and a navigational flow through the presentation data in playing back the presentation data through the player.

* * * * *

UNITED STATES PATENT AND TRADEMARK OFFICE
CERTIFICATE OF CORRECTION

PATENT NO.         : 7,440,972 B2
APPLICATION NO.    : 10/123816
DATED              : October 21, 2008
INVENTOR(S)        : Kenneth G. Oetzel Page 1 of 1

It is certified that error appears in the above-identified patent and that said Letters Patent is hereby corrected as shown below:

Claim 38, column 12, line 24, delete "composting" and insert --compositing--.

Signed and Sealed this

Seventeenth Day of March, 2009

JOHN DOLL
*Acting Director of the United States Patent and Trademark Office*